July 12, 1960
C. S. GLENNY
2,944,712
BICYCLE BASKETS
Filed Aug. 13, 1956
2 Sheets-Sheet 1
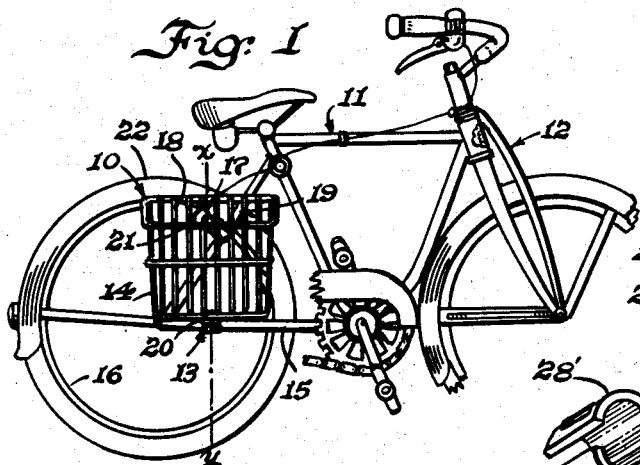
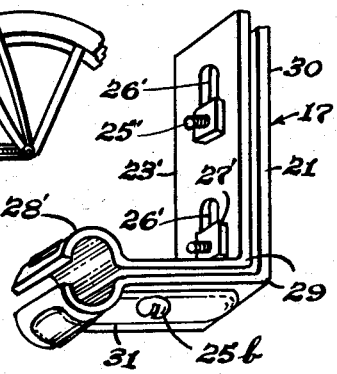
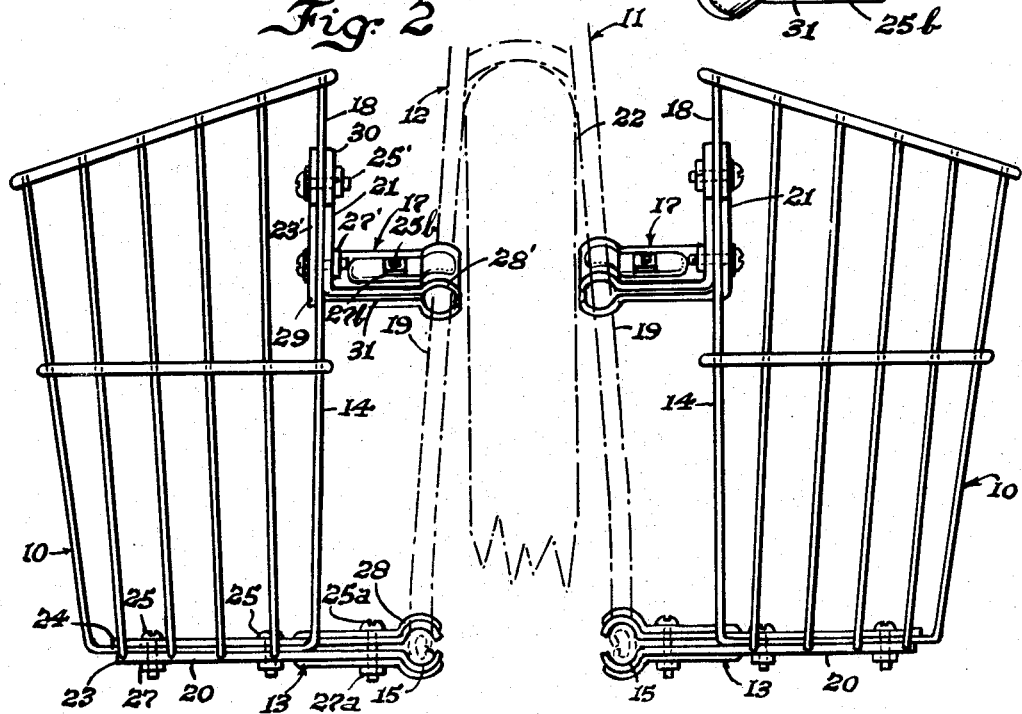
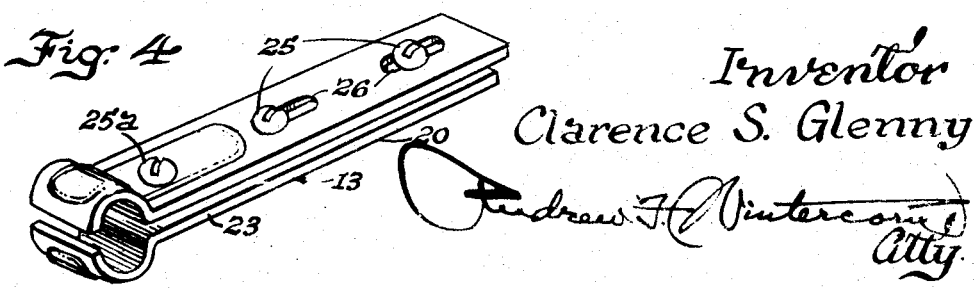
Inventor
Clarence S. Glenny July 12, 1960   C. S. GLENNY   2,944,712
BICYCLE BASKETS
Filed Aug. 13, 1956   2 Sheets-Sheet 2
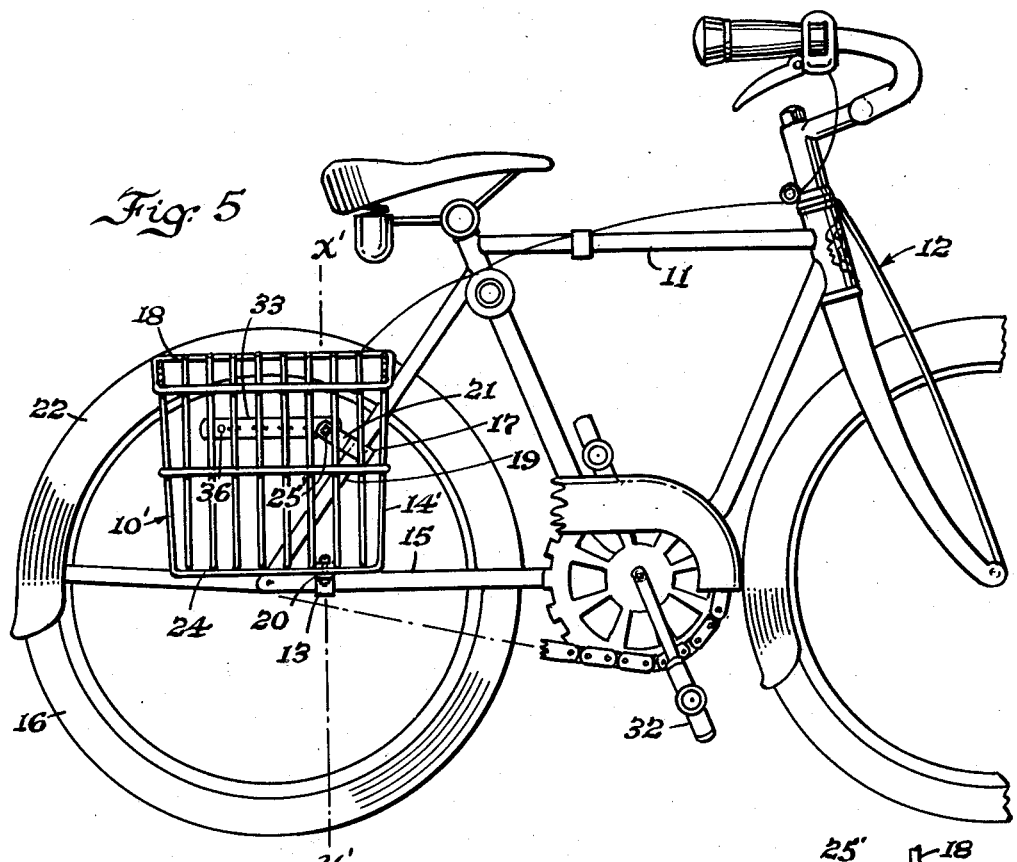
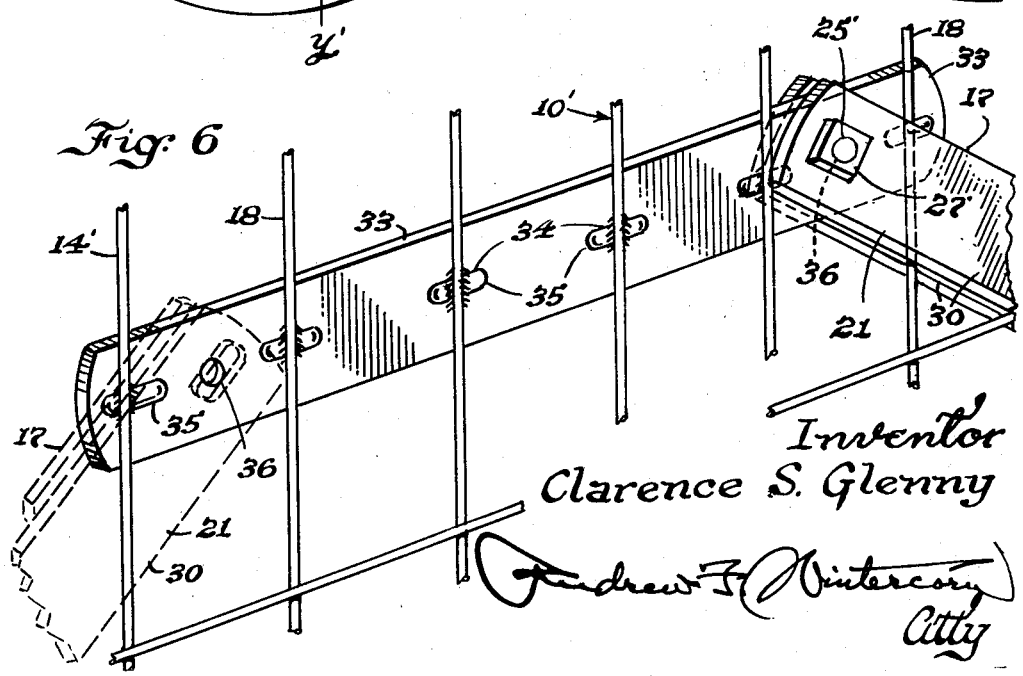
Inventor
Clarence S. Glenny

United States Patent Office 2,944,712
Patented July 12, 1960

2,944,712

BICYCLE BASKETS

Clarence S. Glenny, Rockford, Ill., assignor to The Washburn Company, Worcester, Mass., a corporation of Massachusetts Filed Aug. 13, 1956, Ser. No. 603,648

8 Claims. (Cl. 224—32)

This invention relates to bicycle baskets for application to the rear portions of bicycles on opposite sides of the rear wheel, the present dual carrier baskets relying for their support partly upon attachment to the substantially horizontal rear fork portion and partly upon attachment to be adjacent upwardly inclined rear fork portion, with a view to maximum rigidity and at the same time greater simplicity and economy in construction.

The novel attaching means provided in accordance with my invention have been designed with a view to:

(1) Ease of assembly on a bicycle so that a person having little mechanical ability will not find it too difficult to apply the baskets to a bicycle satisfactorily;

(2) Adjustability and adaptability of the attachments to suit different makes and models of bicycles, the present attachments enabling mounting the baskets spaced outwardly from both sides of the frame far enough to leave ample operating clearance for projecting items of equipment found on certain bicycles;

(3) Reasonably quick and easy detachability of the baskets from the bicycle without sacrificing rigidity and security of connection when attached, it being recognized that some youngsters who need these baskets for carrying newspapers prefer to have the baskets on the bicycle only while they are needed for that purpose, and (4) Minimum damage to the finish on the bicycle by reason of the fastening of the attachments to the frame and fender.

The invention is illustrated in the accompanying drawings, in which—

Fig. 1 is a side view of a bicycle equipped with dual carrier baskets in accordance with my invention;

Fig. 2 is a rear view of the dual carrier baskets and their attaching means, the rear portion of the bicycle being illustrated in phantom to enable better illustration of the invention;

Fig. 3 is a perspective view of one of the L-shaped upper frame-attaching brackets;

Fig. 4 is a perspective view of one of the straight lower frame-attaching brackets;

Fig. 5 is a view similar to Fig. 1 illustrating dual carrier baskets of a modified or alternative design, and Fig. 6 is an enlarged perspective detail of a portion of Fig. 5.

Similar reference numerals are applied to corresponding parts throughout these views.

Referring first to Figs. 1–4, the reference numeral 10 designates dual carrier baskets of my invention generally, shown applied to the rear portion of the frame 11 of a bicycle indicated generally by the reference numeral 12. Two straight lower frame-attaching brackets 13 are provided attached to the bottoms of the baskets 14 at the middle thereof for connection directly opposite one another with the opposite sides of the substantially horizontal rear fork portion 15 for support of the baskets in rigid parallel relationship to the bicycle frame 11 and rear wheel 16, and spaced outwardly from both sides of the bicycle to the same appreciable extent indicated in Fig. 2, giving good balance for easier riding of the bicycle while also providing ample clearance for any projecting equipment on the side of the bicycle, such as a wheel-driven generator or a change-speed control cable extending from one end of the rear axle. Two L-shaped upper frame-attaching brackets 17 are provided connected on the one hand with the upper portion of the inner walls 18 of the baskets 14 and connected on the other hand with the upwardly inclined rear fork portion 19 of the bicycle frame for further support of the baskets in rigid relationship to the bicycle frame. The basket attaching end portions 20 of the lower brackets 13 are disposed approximately in the same vertical plane xy with the basket attaching end portions 21 of the upper brackets 17, as clearly appears in Fig. 1, this plane passing through the middle portion of the two baskets 14, so that the load of newspapers placed in each basket is distributed symmetrically with respect to brackets 13 and 17 supporting the same and the baskets, therefore, are not so apt to get bent out of shape. The loads in the two baskets are also usually kept fairly evenly balanced to enable easier riding and steering. The fact that the baskets 14 are supported solely by connection with the bicycle frame 11 and independently of the rear fender 22, is of advantage not only because of the greater rigidity which that tends to insure but also because it eliminates any danger of the fender 22 getting marred and bent out of shape. It is also generally an easier matter to clamp attaching brackets onto the frame than onto a fender and there is much less likelihood, due to the greater rigidity of a frame as compared to a fender of damaging the finish by tight clamping of the attaching brackets thereto.

The straight lower frame-attaching brackets 13 are of identical construction, and hence, the description of one will serve for both. Each consists of a pair of elongated plates 23 which, as clearly appears in Fig. 2, are disposed in abutment with the inner and outer sides of the wire bottom wall 24 of the basket and have two bolts 25 entered through registering slots 26 provided in the basket attaching end portions of the plates 23, and nuts 27 are threaded on their projecting lower end portions and arranged to be tightened to clamp the plates 23 in adjusted relationship to the bottom of the basket. A third bolt 25a next to the inner end portions of the plates, where the C-shaped jaws 28 are provided, is extended through registering holes in the plates and has a nut 27a threaded on its projecting lower end portion and arranged to be tightened to clamp the jaw portions 28 on the bicycle frame. The bolts 25 and 25a are left loose until the opposed C-shaped jaw portions 28 that are provided on the inner end portion of the plates have been properly located in abutment with the top and bottom of the horizontal fork portion 16 of the bicycle frame, and the plates have also been adjusted properly endwise, laterally with respect to the bottom of the basket, to provide the desired spacing of the basket with respect to the bicycle frame, for the purposes previously mentioned. Then the bolts 25 and 25a are tightened and assure not only secure clamping of the brackets 13 onto the bottom of the baskets 14 but also secure clamping of these brackets on the bicycle frame. The C-shape of the jaws 28, I have found, makes the brackets 13 universally applicable to different makes and models of bicycles whether the frame is of the hollow, generally elliptical section indicated at 15 in Fig. 2 or of a hollow, circular section or of a solid rectangular section.

The two L-shaped upper frame-attaching brackets 17 are also of identical construction, and hence, the description of one will serve for both. Each is made from a pair of elongated plates 23', like plates 23, and therefore adapted to be produced with the same dies, but bent approximately at the middle thereof, as indicated at 29, to L-shape and having the one leg 30 of each L providing the frame attaching portion. Bolts 25' extend through registering slots 26' in the basket attaching portions 30 and have nuts 27' threaded on their projecting outer end portions and arranged to be tightened to clamp the plates firmly in adjusted relationship to the inner side wall 18 of the basket. A third bolt 25b is entered through registering holes in the frame attaching end portions 31 and has a nut 27b threaded on the projecting end portion thereof to clamp the end portions 31 on the bicycle frame. Here again, the bolts 25' and 25b are left loose until the opposed C-shaped jaw portions 28' that are provided on the end portions 31 of the plates have been properly located in abutment with the upright rear fork portion 19 of the bicycle frame, and the plates have also been adjusted properly in the plane of the inner wall 18 of the basket to be sure of obtaining the maximum support and rigidity for the basket. Then the bolts 25' and 25b are tightened and serve to assure not only secure clamping of the brackets 17 on the inner side wall 18 of the baskets but also secure clamping of these brackets on the bicycle frame, and, of course, here again the C shape of the jaws 28' makes the brackets 17 universally applicable to different makes and models of bicycles.

In operation, the brackets 13 and 17 are first loosely applied to the bottom wall 24 and inner side wall 18 of each basket 14 in approximately the middle of said bottom and side walls, after which the C-shaped jaw portions 28 and 28' are loosely engaged with the forks 15 and 19, respectively. Then whatever minor adjustments of the brackets 13 and 17 may be necessary with respect to the baskets and frame to fit properly are made, and all of the bolts are tightened. Thereafter, if the user decides to remove the baskets 14 after each use or at some particular time where the presence of the baskets on the bicycle is objectionable, he can do so without too much difficulty by loosening only the two inner bolts on each of the brackets 13 and 17 just enough to allow spreading the jaws 28 and 28' far enough apart to slip off the forks 15 and 19. In other words, the minor adjustments of the brackets 13 and 17 with respect to the bottom 24 and side wall 18 of the baskets need not be disturbed and it is accordingly a much simpler matter to replace the baskets later.

Referring to Figs. 5 and 6, the numeral 10' designates dual carrier baskets of another design related to baskets 10, each fastened by a straight frame-attaching bracket 13 to the horizontal rear fork portion 15, and by an L-shaped upper frame-attaching bracket 17 to the upwardly inclined rear fork. However, it will be seen that although the basket attaching end portions 20 and 21 of the two brackets 13 and 17 are disposed approximately in the same vertical plane x'y', that plane does not pass through the middle portion of the baskets 14' in this design but is closer to the front end of the baskets, the object being to shift the two baskets farther to the rear away from the pedals 32 and thereby give more foot-room for the rider. That is important where the rider treads more nearly with the toe portion of his shoes on the pedals, and especially if he wears a large size shoe. To enable such a mounting of the baskets I provide as an attaching plate an elongated sheet metal cleat or plate 33 on the inner or outer side of the inner wall 18 of each basket 14', welded to the vertical wires thereof as shown at 34, the plate having elongated embossed portions 35 at each weld in transverse relation to the wires to provide point contact at each intersection and enable the more secure welding together of the parts at each point by what is known as projection welding. The plate 33 it will be seen has a bolt hole 36 in each end portion thereof and this enables use of the same basket interchangeably on the right or left hand side of the bicycle, the plate being entered with wall 18 of the basket between the basket attaching portions 21 of the plates 23' and clamped therebetween by the tightening of a bolt 25' passed through the hole 36, the one hole 36 being used as shown in Fig. 5 and in full lines in Fig. 6, to receive the endmost bolt 25' of bracket 17 when the basket is mounted on the right hand side, and the other hole 36 at the other end being used in the same way when the basket is used for the left hand mount, as indicated in dotted lines in Fig. 6. Thus, it will be seen by comparing Fig. 5 with Fig. 1 that although the brackets 13 and 17 are in approximately the same positions on the bicycle in these two figures, the plates 33 on the baskets 14' enable setting the baskets far enough to the rear to leave ample foot room behind the pedals 32. The plates 33 also serve to reinforce the inner walls 18 considerably so that the baskets are not so apt to get bent out of shape by reason of their support so near one end. The operation of these baskets is otherwise substantially the same as the ones first described.

It is believed the foregoing description conveys a good understanding of the objects and advantages of my invention. The appended claims have been drawn to cover all legitimate modifications and adaptations.

I claim:

1. In a bicycle having a frame including a substantially horizontal rear fork portion and an upwardly inclined rear fork portion, a carrier basket disposed vertically in spaced substantially parallel relation to one side of said fork, a straight elongated bracket horizontally disposed under and secured to the bottom of said basket transversely of a portion thereof intermediate the front and back of the basket and extending from the inner side of the basket to the horizontal fork portion and having means on the outer end thereof for rigidly securing the same thereto for support of the basket on said fork, and a substantially L-shaped bracket having one leg of the L disposed in a substantially vertical plane and adjustably but rigidly secured to the upper portion of the inner wall of the basket with the other leg of the L disposed substantially horizontally and turned on its longitudinal axis to whatever angularity is necessary to suit the inclination of the upwardly inclined rear fork portion, said first mentioned leg being elongated and having means thereon in longitudinally spaced relation with respect thereto for securing the same to the basket, the elongation of said leg providing increased length of bearing contact on the basket and wider spacing of the points of connection with the basket for increased rigidity, the horizontal leg of the L extending from the basket to the upwardly inclined fork portion and being elongated to space the basket from the bicycle and having means for rigidly securing the same to said fork for further support of the basket on the bicycle frame.

2. In a bicycle having a frame including a substantially horizontal rear fork portion and an upwardly inclined rear fork portion, a carrier basket disposed vertically in spaced substantially parallel relation to one side of said fork, a straight elongated bracket horizontally disposed under and secured to the bottom of said basket transversely of a portion thereof intermediate the front and back of the basket and extending from the inner side of the basket to the horizontal fork portion and having means for rigidly securing the same thereto for support of the basket on said fork, and a substantially L-shaped bracket having one leg of the L disposed in a substantially vertical plane and adjustably but rigidly secured to the upper portion of the inner wall of the basket with the other leg of the L disposed substantially horizontally and turned on its longitudinal axis to whatever angularity is necessary to suit the inclination of the upwardly inclined rear fork portion, said first mentioned leg being elongated and having means thereon in longitudinally spaced relation with respect thereto for securing the same to the basket, the elongation of said leg providing increased length of bearing contact on the basket and wider spacing of the points of connection with the basket for increased rigidity, the horizontal leg of the L extending from the basket to the upwardly inclined fork portion and being elongated to space the basket from the bicycle and having means on the outer end thereof for rigidly securing the same to said fork for further support of the basket on the bicycle frame, the attaching portions of the two brackets being disposed in the same substantially vertical plane through the approximate middle portion of said basket.

3. In a bicycle having a frame including a substantially horizontal rear fork portion and an upwardly inclined rear fork portion, a carrier basket disposed vertically in spaced substantially parallel relation to one side of said fork, a bracket horizontally disposed under said basket and secured to the bottom of the latter nearer one end than the other of the basket and having means for securing the same to the horizontal fork portion for rigid support of the basket by its bottom on said fork, a fore and aft extending plate rigidly secured in a vertical plane to the upper portion of the inner side wall of the basket, and another bracket secured to one end portion of said plate and having means for securing the same to the upwardly inclined fork portion for further support of the basket on the bicycle frame, said plate having holes provided in the opposite ends thereof for attachment of the last named bracket interchangeably to either end, so that the same basket may be mounted alike on either side of the bicycle.

4. In a bicycle having a frame including a substantially horizontal rear fork portion and an upwardly inclined rear fork portion, a carrier basket disposed vertically in spaced substantially parallel relation to one side of said fork, a straight elongated bracket horizontally disposed under and secured to the bottom of said basket transversely thereof and extending from the inner side of the basket to the horizontal fork portion and having means on the outer end thereof for securing the same thereto for rigid support of the basket on said fork, a fore and aft extending plate rigidly secured in a vertical plane to the upper portion of the inner side wall of the basket, and a substantially L-shaped bracket having one leg of the L substantially vertically disposed and rigidly secured to one end portion of said plate, the other leg of the L extending substantially horizontally from the basket to the upwardly inclined fork portion and being elongated to space the basket from the bicycle and having means on the outer end thereof for rigidly securing the same to said fork for further support of the basket on the bicycle frame.

5. A structure as set forth in claim 4 wherein said plate has holes provided in the opposite ends thereof for attachment of the last named bracket interchangeably to either end, so that the same basket may be mounted alike on either side of the bicycle.

6. In a bicycle having a frame including an upwardly inclined rear fork portion, a carrier basket disposed vertically in spaced substantially parallel relation to one side of said fork, means providing supporting connection for the lower end portion of the basket on the side of the bicycle, a fore and aft extending plate rigidly secured in a vertical plane to the upper portion of the inner side wall of the basket, and a substantially L-shaped bracket having one leg of the L substantially vertically disposed and rigidly secured to one end portion of said plate, the other leg of the L extending substantially horizontally from the basket to the upwardly inclined fork portion and being elongated to space the basket from the bicycle and having means on the outer end thereof for rigidly securing the same to said fork for further support of the basket on the bicycle frame, said plate having holes provided in the opposite ends thereof for attachment of the bracket interchangeably to either end, so that the same basket may be mounted alike on either side of the bicycle.

7. In a bicycle having a frame including a substantially horizontal rear fork portion and an upwardly inclined rear fork portion, a carrier basket disposed vertically in spaced substantially parallel relation to one side of said fork, a bracket horizontally disposed under said basket and secured to the bottom thereof transversely of a portion thereof intermediate the front and back of the basket and extending from the inner side of the basket to the horizontal fork portion and having means on the outer end thereof for rigidly securing the same thereto for support of the basket on said fork, a fore and aft extending plate rigidly secured in a vertical plane to the inner side wall of the basket in upwardly spaced relation to the aforesaid bracket, and a substantially L-shaped bracket having one leg of the L disposed in a substantially vertical plane and pivotally adjustably but rigidly secured to one end portion of said plate with the other leg of the L disposed substantially horizontally and turned on its longitudinal axis to whatever angularity is necessary to suit the inclination of the upwardly inclined rear fork portion and having means on the outer end thereof for rigidly securing the same to said fork for further support of the basket on the bicycle frame.

8. A structure as set forth in claim 7 wherein said plate has holes provided in the opposite ends thereof for attachment of the last named bracket interchangeably to either end, so that the same basket may be mounted alike on either side of the bicycle.

References Cited in the file of this patent

UNITED STATES PATENTS

| | | |
|---|---|---|
| 1,154,197 | Musselman | Sept. 21, 1915 |
| 2,010,479 | Dennis | Aug. 6, 1935 |
| 2,578,243 | Hampton | Dec. 11, 1951 |
| 2,704,626 | Meir | Mar. 22, 1955 |

FOREIGN PATENTS

| | | |
|---|---|---|
| 223,688 | Switzerland | Dec. 16, 1942 |
| 448,457 | Italy | May 18, 1949 |
| 670,466 | Great Britain | Apr. 16, 1952 |

UNITED STATES PATENT OFFICE
CERTIFICATE OF CORRECTION

Patent No. 2,944,712　　　　　　　　　　　　　　　　July 12, 1960

Clarence S. Glenny

It is hereby certified that error appears in the printed specification of the above numbered patent requiring correction and that the said Letters Patent should read as corrected below.

Column 4, line 51, after "means" insert -- on the outer end thereof --; line 63, after "means" insert -- on the outer end thereof --.

Signed and sealed this 25th day of April 1961.

(SEAL)
Attest:

ERNEST W. SWIDER
Attesting Officer

DAVID L. LADD
Commissioner of Patents